United States Patent [19]

Wong et al.

[11] Patent Number: 5,211,608
[45] Date of Patent: May 18, 1993

[54] LOW NOISE TIMING BELT

[75] Inventors: Chee-Chiu J. Wong, Fairport; Walter J. Sanborn, West Henrietta, both of N.Y.

[73] Assignee: Xerox Corporation, Stamford, Conn.

[21] Appl. No.: 722,735

[22] Filed: Jun. 27, 1991

[51] Int. Cl.$^5$ .............................................. F16H 1/00
[52] U.S. Cl. ..................................... 474/202; 474/249
[58] Field of Search ............... 474/202, 237, 249–252, 474/167

[56] References Cited

U.S. PATENT DOCUMENTS

| | | |
|---|---|---|
| 137,224 | 3/1873 | Mansfield . |
| 249,897 | 11/1881 | Cilley . |
| 383,373 | 5/1888 | Schieren . |
| 455,852 | 7/1891 | Schieren . |
| 941,786 | 11/1909 | Kolbe ................................. 474/251 |
| 1,028,783 | 6/1912 | Von Raberau . |
| 1,661,300 | 3/1928 | Perpall . |
| 4,832,672 | 5/1989 | Bielfeldt .............................. 474/260 |
| 5,055,090 | 10/1991 | Miranti, Jr. ......................... 474/249 |

FOREIGN PATENT DOCUMENTS

| | | |
|---|---|---|
| 0211730 | 2/1987 | European Pat. Off. . |
| 558689 | 11/1922 | France . |
| 472101 | 4/1949 | Italy ................................... 474/250 |

OTHER PUBLICATIONS

Machine Design, Berg. Inc. East Rockaway NY 11518, Jan. 24, 1991, p. 9.

Primary Examiner—Thuy M. Bui

[57] ABSTRACT

Low noise timing belts for use in belt drive systems include either perforations cut into their thin segments or spiral grooves cut into their thick segments in order to allow air pockets to escape in all directions during teeth engagement of belts and pulleys, thereby reducing the noise generated in the process.

7 Claims, 4 Drawing Sheets

LOW NOISE TIMING BELT

BACKGROUND OF THE INVENTION

This invention relates to timing belt systems, and more particularly, to low noise timing belts for use in such systems.

Excessive noise from copier/printers in working environments has been an irritant to users from the advent of such machines until the present day. One of the major contributors to machine noise has been found to be timing belts where engagement between the teeth of the belts and the pulleys emit noise. As the air pockets between the teeth of the belts and the pulleys are displaced periodically along the lateral direction of motion, the disturbance modulates air in the surrounding areas and generates noise. Noise spectra of a typical timing belt as shown in FIG. 1 indicates that the acoustic energy comes from two areas; (i) the energy at mesh frequency and its harmonics; and (ii) the energy at high frequencies which is a result of impact. The noise level is proportional to a number of things, for example, the volume of the air pockets being displaced and the rate at which they are displaced. The peaks at 630 Hz and 1250 Hz in FIG. 1 are the mesh frequency and the harmonics, respectively. The energy at 2 KHz and above is due to impact of the teeth of the timing belt.

PRIOR ART

Treatment of flat belts for various reasons include:

U.S. Pat. No. 1,661,300 discloses a transmission belt that allows a film of air that is caught between a moving belt and a pulley of a transmission system to escape immediately upon being trapped, thereby avoiding slipping and enabling the belt to transmit power under less tension. The belt consists of perforations (5, 8) on one side of the belt which connect to longitudinal grooves (4, 10) cut into the other side of the belt. The openings free the trapped air that accumulates between the belt and its pulley.

U.S. Pat. No. 383,373 is directed to a belt apparatus which prevents the air cushioning of belting upon the face of a pulley. The belt is perforated to provide air spaces in the solid belting through which a layer of air may escape.

U.S. Pat. No. 4,832,672 discloses a precompaction belt used in the production of particle boards which has predetermined perforations to allow hot air from a hot press to escape. In addition, the perforated belt avoids further difficulties such as the adherence or scattering of particles by means of these holes.

U.S. Pat. No. 249,897 is directed to a belt and pulley apparatus consisting of holes and grooves along their surfaces to afford free escape of air. This design allows the belt and the pulley to have an increased frictional contact facilitated by the removal of the thin film of air that can develop between them.

U.S. Pat. No. 1,028,783 discloses a motor cycle driving belt which employs several different configurations to allow air and rainwater to escape from between the driving belts and the grooved pulleys they interact with. The grooves and studs provide the belt with greater flexibility and thus, more resiliency.

U.S. Pat. No. 455,852 is directed to a belt having transverse channels on its face which facilitate the dissipation of a layer of air which is confined between a pulley and belt faces. The channels, through which the air is forced, are at right angles to the length of the belt.

U.S. Pat. No. 137,224 discloses a feed and delivery apron for machines used in the preparation of fiber made of rubber and cloth upon which grooves and projections are formed which increase the flexibility of the belt.

The copy of page 9 from the Jan. 24, 1991 issue of Machine Design discloses a timing belt by Berg, Inc. of East Rockaway, N.Y. 11518, that list being silent as a feature.

It has been found at present through research that if the air pockets between the teeth of belts and pulleys are allowed to escape in all directions, the acoustic energy at mesh frequency, as well as, the harmonics will be minimized. The noise level due to impact will also be reduced.

SUMMARY OF THE INVENTION

Accordingly, a low noise timing belt is disclosed that in one embodiment employs perforations cut into the belt in order to allow air to escape in all directions during impact of the belt teeth with various pulleys thereby reducing the noise generated in the process. In another embodiment, grooves are cut across the teeth of the belt in order to allow air to escape in all directions upon impact of the teeth of the timing belt with the pulley on which it is mounted and reduce noise in the process.

DETAILED DESCRIPTION OF THE INVENTION

Figure 1:
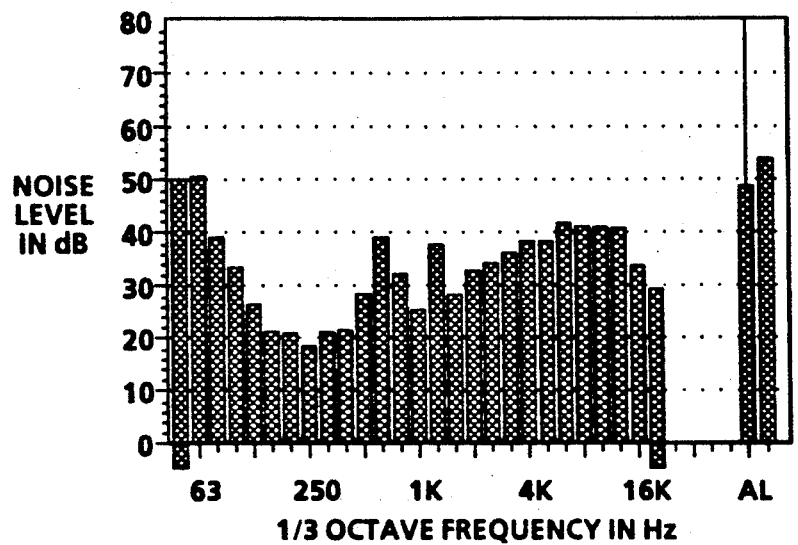
FIG. 1 is a typical noise spectrum of a prior art timing belt.
Figure 2A:
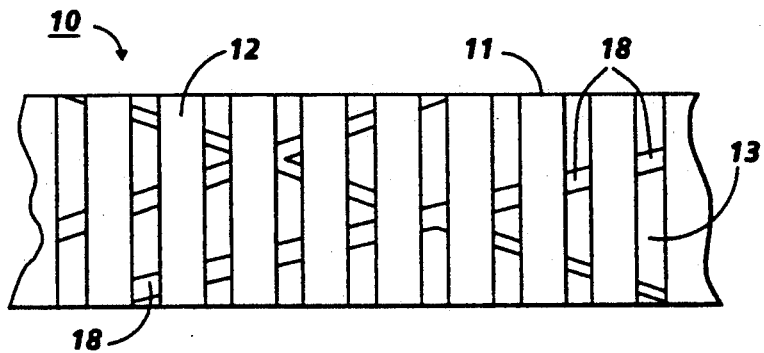
FIG. 2A shows a partial, enlarged plan view of a timing belt in accordance with the present invention that includes spiral grooves through the peaks of the belt.
Figure 2B:
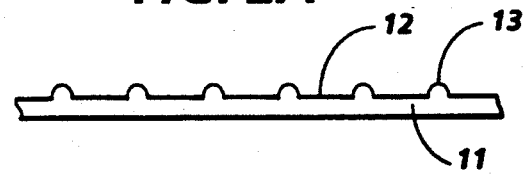
FIG. 2B is a partial enlarged elevational view of the timing belt of FIG. 2A showing the profile of the belt.
Figure 3:
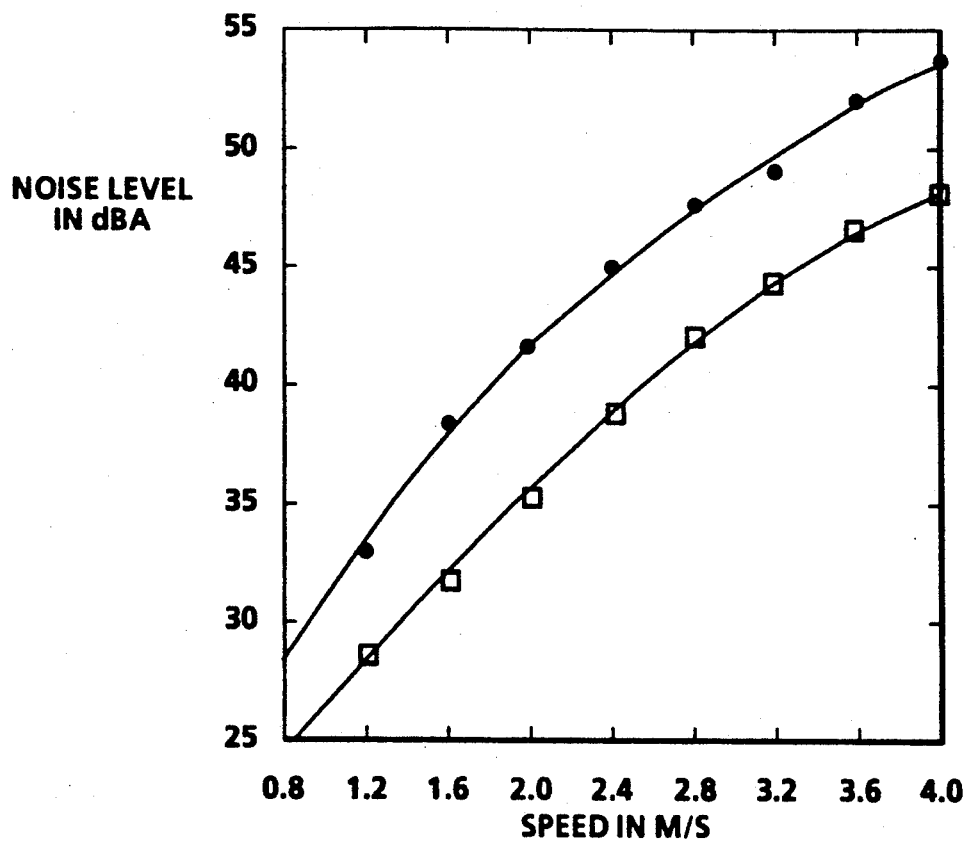
FIG. 3 is a graph showing test results obtained by comparing the noise levels of the timing belt of FIG. 2A against a conventional timing belt.

If air in pockets between the teeth of belts and pulleys is allowed to escape in all directions, the acoustic energy at the mesh frequency and harmonics will be minimized. A preferred means of accomplishing this is shown in FIGS. 2A and 2B that comprises a timing belt member 10 that includes a main belt portion 11 that has a series or plurality of peaks or orthogonal ridges or teeth 13 thereon that are each followed by a land or valley thereof. The teeth 13 have randomly patterned, spiral shaped grooves 18, cut therethrough to the land portions of the belt 11. With this spiral shaped pattern or configuration of grooves in the belt, noise was allowed to escape in all directions when the teeth of the belt come into contact with teeth of pulleys. With 5 mm HTD belts, test results as depicted in FIG. 3 show noise improvement of 6 dBA (75%). The spirals 18 will not weaken the belts or affect the reliability of drive systems since most timing belts include a high safety factor as a design parameter. The results of FIG. 3 were obtained with a center distance (axial distance between pulleys) of 220 mm, a tension of 135N and a torque of 0.3 Nm. IN FIG. 3, the noise level in dBA is plotted vis-a-vis the speed of a timing belt in M/S. The symbol ● is used to designate a conventional timing belt while the symbol □ is used to designate the test results of the timing belt of FIG. 2A. Grooves of any configuration can be used to yield similar results as long as they are transverse to the longitudinal dimension of the belt.

Figure 2C:
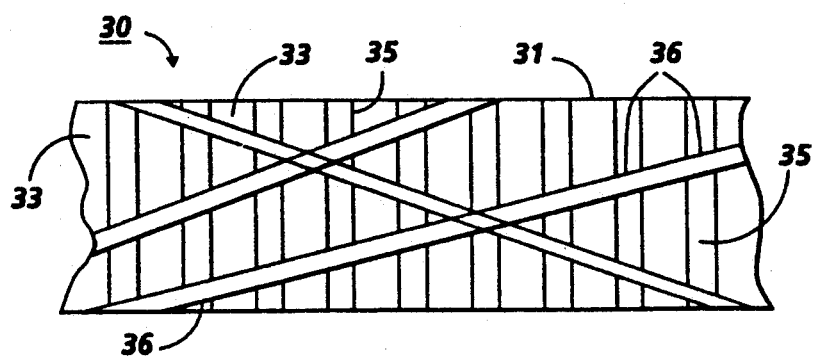
FIG. 2C is a partial, enlarged plan view of a timing belt in accordance with the present invention that includes transverse grooves across the teeth and lands of the belt.

An alternative embodiment of a low noise timing belt is shown in FIG. 2C that comprises a belt 30 that has a main belt portion 31 with a plurality of teeth 35 projecting orthogonally thereto. The teeth 35 are spaced a predetermined distance apart from each other by land portions 33. In order to minimize noise created by the teeth of the timing belt meshing with teeth of pulleys on which the belt is mounted, a transverse, random pattern of grooves 36 are cut into the teeth and lands that allow air to escape in all directions as the teeth of the belt and pulleys mesh during operation of a timing belt system. Grooves 36 do not extend completely through the lands 33.

Figure 4A:
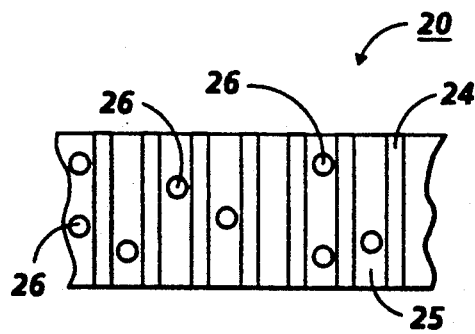
FIG. 4A shows a partial, enlarged plan view of an alternative timing belt of the present invention that includes perforations on the thin segments of the belt.
Figure 4B:
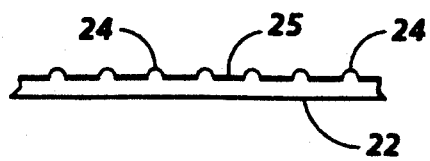
FIG. 4B is a partial, enlarged elevational view of the timing belt of FIG. 4A showing the profile of the belt.

An alternative embodiment of a low noise timing belt in accordance with the present invention is shown in FIGS. 4A and 4B that comprises a timing belt 20 which has a support structure 22 that includes a plurality of teeth 24 and lands 25 that alternate with each other throughout the length of the belt. The land portions 25 of the belt have randomly positioned and spaced perforations 26 therethrough that facilitate the escape of air as the teeth 24 of the belt come into contact with teeth of mating pulleys and in the process, the noise level created by air between the teeth of the pulleys and the teeth of the belts is reduced. In addition, the impact noise created by teeth engagement is reduced.

Figure 4C:
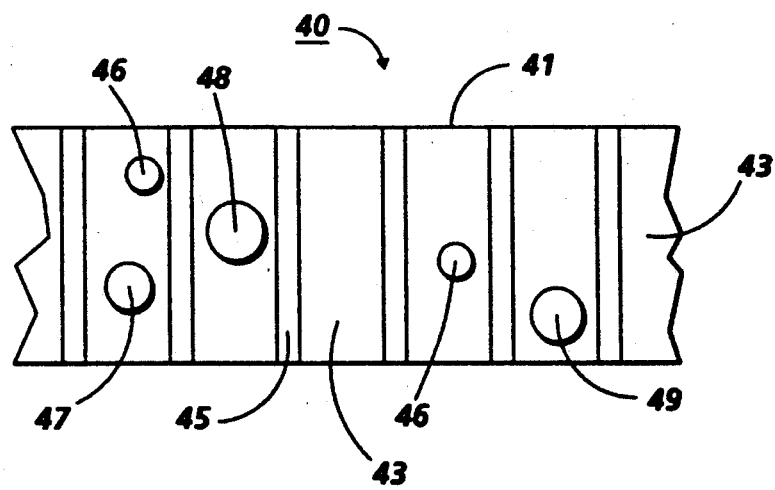
FIG. 4C shows a partial, enlarged plan view of an alternative timing belt in accordance with the present invention that includes random perforations of different sizes in the lands of the belt.
Figure 4D:
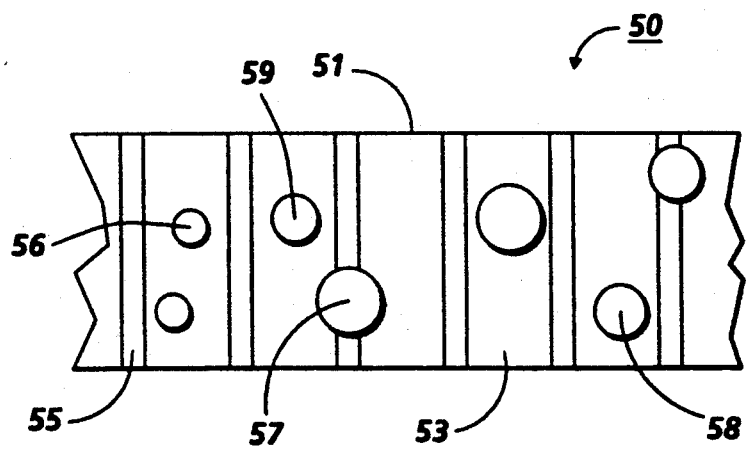
FIG. 4D shows a partial, enlarged plan view of yet another embodiment of a timing belt in accordance with the present invention that includes random perforations of varying sizes in both the teeth and lands of the belt.
Figure 4E:
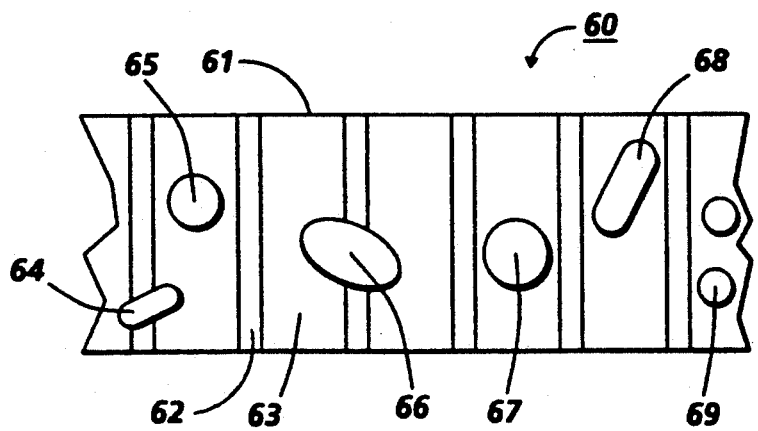
FIG. 4E shows a partial, enlarged plan view of another alternative embodiment of a timing belt in accordance with the present invention that has random perforations in both the teeth as well as the lands of the belt with some of the perforations extending into both the teeth and lands.

Other alternative embodiments of timing belts that reduce noise during operation of a timing belt system are shown in FIGS. 4C-4E. In FIG. 4C, timing belt 40 comprises a support structure 41 that has land portions 43 separating teeth 45. A random pattern of circular perforations 46, 47, 48 and 49 are cut through lands 43 of belt 41 to promote the escape of air during engagement of teeth of the timing belt with teeth of drive and driven pulleys and thereby reduce noise that would ordinarily be created. A different low noise timing belt 50 is shown in FIG. 4D that includes a belt support structure 51 supporting teeth 55 that are separated by land portions 53. Perforations 56, 57, 58 and 59 of randomly positioned circles are cut through both the teeth and lands of the belt in order to reduce noise that would occur if air were not allowed to escape through the perforations as the teeth of the belt mesh with teeth of drive and driven pulleys as the timing belt is rotated during operation of a belt drive system. Yet another embodiment of a low noise timing belt 60 in accordance with the present invention is shown in FIG. 4E that comprises a belt support structure 61 having teeth 62 thereon that are spaced apart by lands 63. The low noise aspect of belt 60 is obtained by the addition of randomly positioned and configured perforations 64, 65, 66, 67, 68 ad 69 that allow air to escape therethrough as the teeth of the timing belt engage with teeth of pulleys of a belt drive system. While preferred embodiments of timing belts are shown in FIGS. 4C-4E as having perforations therethrough that are random in size, location and shape, it should be understood that perforations of the same size can be used with less effectiveness.

Figure 5:
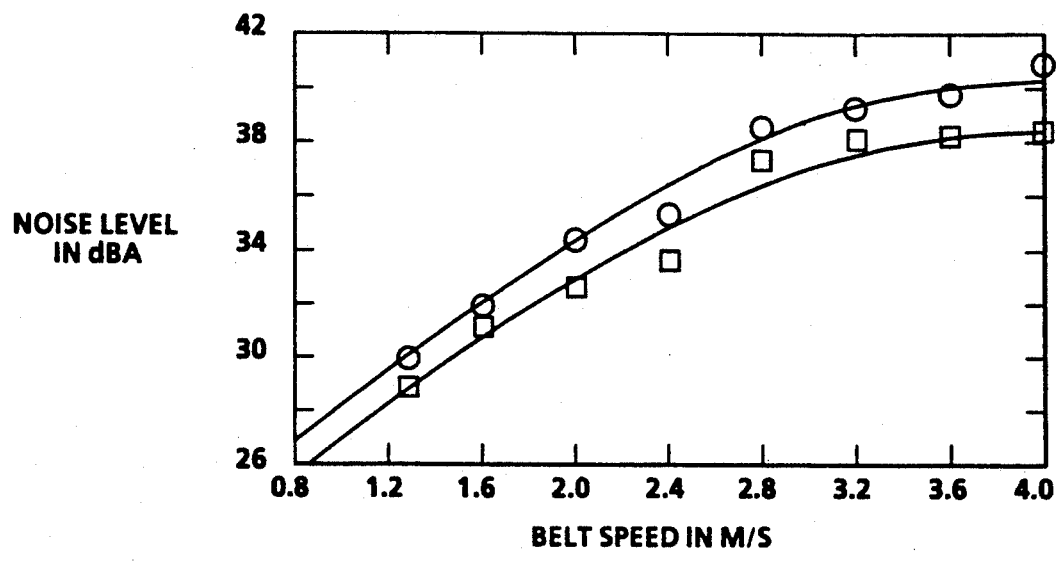
FIGS. 5 and 6 are graphs showing tests of timing belts with 3 mm HTD and 5 mm HTD, respectively, against a standard timing belt.

As seen from the graph in FIG. 5, test results of the noise level of a timing belt with perforations in the lands thereof is plotted vis-a-vis a conventional timing belt without perforations in it. The timing belt tested in FIG. 5 with perforations is represented in the graph by the symbol □, while the timing belt with no perforations in its surface is represented by the symbol . The timing belt had 3 mm HTD pitch, a center distance (axial to axial) of 216 mm, a tension of 45N and a torque of 0.3 Nm. The reduction in noise of the symbol □ over the symbol is about 2 dBA (40%). Neoprene belts were tested, however, it should be understood that belts of any kind could be used to give similar results.

Figure 6:
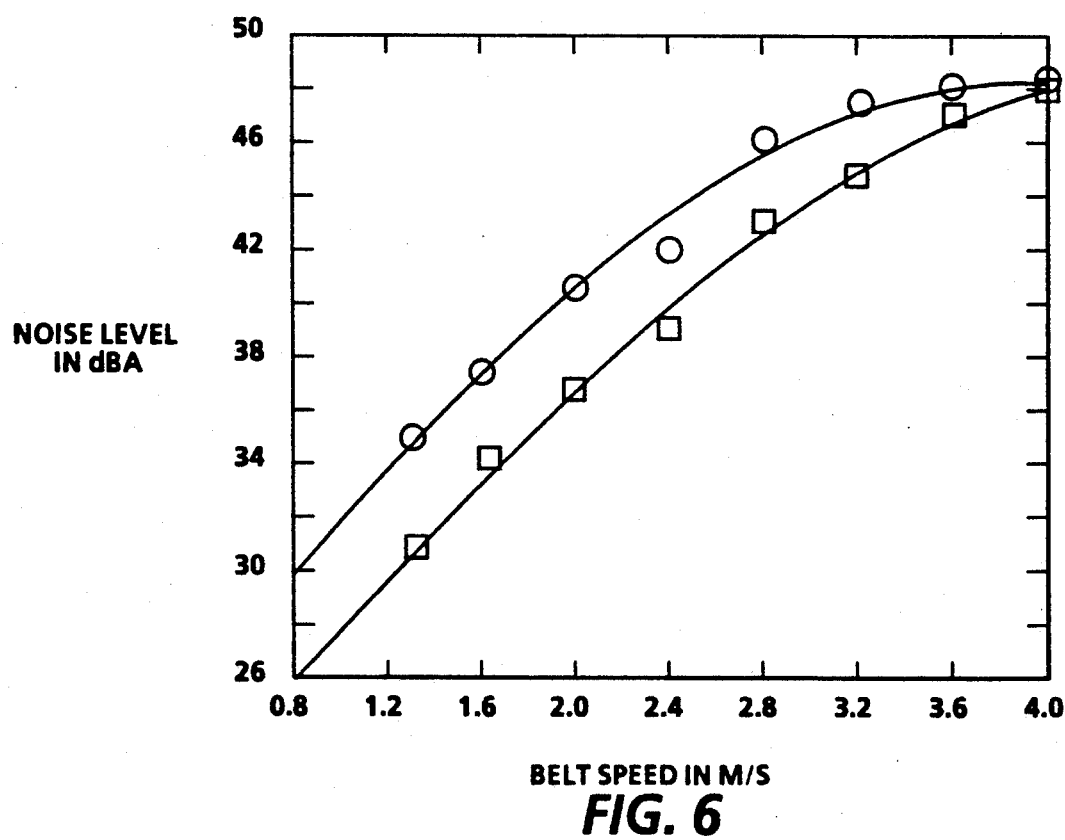

In FIG. 6, noise level test results are shown for neoprene timing belts with a 5 mm HTD, center distance (axial to axial), tension of 135N and a torque of 0.3 Nm. Results for a standard timing belt is shown by the symbol while results for a timing belt with perforations in it is represented by the symbol □. As indicated in the graph, the noise was reduced by the belt with perforations in it by about 5 dBA or 70%.

As will be readily understood from the foregoing description, the low noise feature of the timing belt of the present invention is attained by providing grooves across the teeth of the timing belt or perforations in the belt.

The invention has been described in detail with particular reference to the preferred embodiment thereof, but it will be understood that reasonable variations and modifications are possible without departing from the spirit and basic scope of the invention.

We claim:

1. In a positive, non-frictional belt drive system that includes a timing belt entrained around spaced apart drive and driven members having teeth thereon, the improvement for reducing the noise level of the timing belt, characterized by:

alternating teeth and lands on one surface of said timing belt, and wherein said teeth include randomly spaced, non-parallel, transverse and non-orthogonal grooves cut across said teeth that allow air pockets to escape in all directions when said teeth mate with teeth of the drive and driven members during operation of the system.

2. The belt drive system of claim 1, wherein said grooves are cut across both said teeth and lands.

3. The belt drive system of claim 2, wherein said grooves extend into said lands a predetermined depth.

4. The belt drive system of claim 1, wherein said grooves are randomly spaced with respect to each other.

5. The belt drive system of claim 1, wherein said grooves are equally spaced with respect to each other.

6. In a belt drive system that includes a timing belt entrained around spaced apart drive and driven members, the improvement for reducing the noise level of the timing belt, characterized by: alternating teeth and lands on one surface of said timing belt, and wherein said teeth include randomly spaced, non-parallel, transverse and non-orthogonal grooves cut across said teeth that allow air pockets to escape in all directions when said teeth mate with teeth of the drive and driven members during operation of the system.

7. The belt drive system of claim 6, wherein said randomly spaced, non-parallel, transverse and non-orthogonal grooves are cut across both said teeth and lands.

* * * * *